United States Patent Office 3,213,065
Patented Oct. 19, 1965

3,213,065
POLYESTERS AND POLYURETHANES FROM 5-AMINO-BENZENE-1,3-DICARBOXYLIC ACID
Wilhelm Bunge and Otto Bayer, Leverkusen, Germany, assignors to Farbenfabriken Bayer Aktiengesellschaft, Leverkusen, Germany, a German corporation
No Drawing. Filed Nov. 6, 1959, Ser. No. 851,233
Claims priority, application Germany, Nov. 10, 1958,
F 27,007
15 Claims. (Cl. 260—75)

This invention relates to coating compositions and to a method of preparing the same and more particularly to polyester coating compositions having superior properties than those heretofore known.

It has been heretofore known to use polyesters in the manufacture of coating compositions. These polyesters are generally prepared by reacting a discarboxylic acid, for example, adipic acid, succinic acid and the like; or the aromatic dicarboxylic acids such as, terephthalic and the like with polyhydric alcohols such as, ethylene glycol or glycerine to form polyesters having terminal hydroxyl groups. These compositions exhibit various properties which are not entirely satisfactory for use as coating compositions. For example, in many instances these coating compositions will not adhere rigidly to supporting structures. Secondly, the heat resistance of these materials is not always as high as that required for the particular use in which the composition is to be used.

It has also been known heretofore, to react the compositions, stated above, with polyisocyanates to obtain coating compositions having superior elasticity. This type of reaction improves the properties of these coating compositions to some extent, but does not greatly increase the heat resistance or the adherence to a substrate since these properties are dependent almost entirely upon the properties of the particular polyester used and not the isocyanates.

It is, therefore, an object of this invention to provide improved coating compositions. It is another object of this invention to provide coating compositions having improved mechanical and physical properties. It is a further object of this invention to provide coating compositions which are highly resistant to corrosion and to attack by chemicals and the like. It is still another object to provide improved coating compositions which are stable at high temperatures. It is a still further object of this invention to provide coating compositions having superior electrical properties than heretofore known. It is another object of this invention to provide a method for preparing coating compositions having improved properties.

The above objects and others which will become apparent from the following description, are accomplished in accordance with the present invention, generally speaking, by providing polyester-type reaction products prepared by condensing 5 - amino - benzene-1,3-dicarboxylic acid or derivatives thereof, such as for example, the lower alkyl esters or the alkyl urethanes at elevated temperatures with an excess of a suitable organic compound containing at least two hydroxyl groups. This reaction product is then applied to a substrate material and cured by heating to an insoluble heat resistant tightly adherent layer on the substrate.

In accordance with this invention, the required ingredient is represented by the formula:

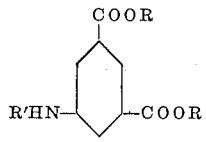

where R is hydrogen or lower alkyl such as, for example, methyl, ethyl, propyl, isopropyl, butyl, isobutyl, tertiary butyl, amyl, hexyl, heptyl and the like, R' is hydrogen or the —COOR" group wherein R" is the methyl, ethyl or propyl group.

In some instances, it is desirable to react dicarboxylic acids with the materials mentioned previously to modify the properties of the resulting composition. Suitable polycarboxylic acids include such as, for example, oxalic acid, succinic acid, adipic acid, methyladipic acid, glutaric acid, pimelic acid, sebacic acid, azelaic acid, suberic acid, isophthalic acid, terephthalic acid, phthalic acid, chlorinated phthalic acid, hexachloroendomethylene tetrahydrophthalic acid, 4,4'-diphenylsulfone dicarboxylic acid, citric acid, benzene-1,2,4-tricarboxylic acid, benzene-1,3,5-tricarboxylic acid, maleic acid, fumaric acid, itaconic acid, citraconic acid and the like.

Any suitable organic compound containing at least two hydroxyl groups may be used in the condensation process of this invention with 5-amino-benzene-1,3-dicarboxylic acid, or the derivatives thereof such as, for example, ethylene glycol, propylene glycol, 1,3-butylene glycol, 1,4-butylene glycol, hexanediol, 2,2-dimethyl-1.3-propanediol, butenediol, quinitol, 4,4'-dihydroxydicyclohexyl dimethyl methane, glycerine, trimethylol ethane, trimethylol propane, hexanetriol, pentaerythritol, diethanolamine, triethanolamine, thiodiglycol, hydrogenated caster oil, p-xylylene glycol, dihydroxyethyl hydro quinone, dihydroxyethyl-1,5-dihydroxy-naphthylene and the like. Also suitable for use as the polyhydroxy components of the aforementioned reaction, are included such as, for example, polyhydric polyalkylene ethers which are the reaction products of the aforementioned polyhydroxy compounds with alkylene oxides such as, for example, ethylene oxide, propylene oxide, butylene oxide, styrene oxide, and the like. Also suitable are the reaction products of polyhydric phenols such as, for example, the bis-beta-hydroxyethyl-ether of 4,4'-dihydroxy-diphenyl dimethyl methane with alkylene oxides such as as those mentioned above. It is, of course, also possible to use polyesters prepared by condensing any of the aforementioned polycarboxylic acids with an excess of any of the aforementioned polyhydroxy compounds to obtain polyesters having terminal hydroxyl groups.

In accordance with this invention, it is at times desirable to modify the properties of the products obtained by the process. This is possible, by using mixtures of 5-amino-benzene-1,3-dicarboxylic acids with a minor amount of other polycarboxylic acids as mentioned above and also to use mixtures of other carboxylic acids and mixtures of polyalcohols, as well as, to a subordinate degree, monocarboxylic acids such as, for example, benzoic, caproic and the like; and monohydric alcohols such as, for example, ethanol, propanol and the like; and mixtures thereof.

In accordance with this invention, it is necessary that 5-amino-benzene-1,3-dicarboxylic acid, the lower alkyl esters or the alkyl urethanes thereof are heated together with an excess of an organic compound containing at least two hydroxyl groups to a temperature of from about 120° C. to about 220° C. The mixture is preferably heated slowly up to 200° C. to about 220° C. either under normal conditions, in an inert gas atmosphere or under a partial vacuum. The reaction is permitted to take place until a predetermined amount of alcohol or water is split off depending upon whether the dicarboxylic acid or the esters thereof were used as the starting materials. If desired, a portion of the excess of the organic compound containing at least two hydroxyl groups may be removed by distillation under normal conditions or under a vacuum. If additional dicarboxylic acids or derivitives thereof such as, the esters or anhydrides other than 5-amino-benzene-1,3-dicarboxylic acid are to be used to modify the product, they may be jointly heated with the polyhydroxy compound and the 5-amino-benzene-1,3-dicarboxylic acid mentioned above.

The reaction to split out either water or alcohol depending upon the initial material selected, may be accelerated by concurrently using entraining agents such as, for example, benzene, toluene, xylene, or especially by adding known catalysts such as, for example, lead oxide, lead acetate, zinc acetate, zinc octoate, zinc naphthanate, titanium tetrabutylate, or soluble compounds of tin, molybdenum, iron, and the like. Other suitable catalysts such as, those set forth in chapter 10, "Unit Processes in Organic Synthesis," by P. H. Groggins (third edition), published by McGraw-Hill Book Company, may be used. Any suitable amount of catalyst may be used. Of course, catalytic amounts are contemplated within the scope of this invention with quantities of from about 0.01 to about 0.5% by weight being preferred. The most preferred amount of catalyst being about 0.1% by weight. The degree of esterification or trans-esterification can accurately be determined by a number of procedures such as, for example, the determination of the acid number, by establishing the softening points, or by determining the viscosity of the solution in cresol.

The ratio between the components can fluctuate within wide limits. However, in every case an excess of the polyhydroxy compound is used in order to insure condensation products having free hydroxyl groups as well as amino groups. In the esterification or trans-esterification, a substantially larger quantity of the polyhydroxy compound than that calculated as necessary to react with the R groups of the preceding formula is used. This excess is removed again during the reaction by distillation either under normal conditions or preferably in a vacuum. The hydroxyl content of the polyester should be about 1% to about 12%.

The polyester condensation product of this invention passes through all stages of solubility in alcohol solvents depending upon the condensation period and the condensation temperature. With increasing temperature and lengthening of the condensation period, the molecular weight and insolubility of the condensation product increases until eventually, it is completely insoluble. In accordance with one particular embodiment of the invention, this feature permits the final curing of the condensation product to take place after the material has been applied to a substrate. In this particular case, it is expedient to work in a solvent since otherwise the condensation product may become solid and pulverisable before the desirable state is reached.

Any suitable solvent may be used such as, for example, ketones, such as acetone, methyl ethyl ketone, methyl isobutyl ketone, and the like; esters such as, for example, methyl acetate, ethyl acetate, butyl acetate, and the like; glycol ethers such as, for example, the reaction product of ethylene glycol and ethylene oxide and the like, or glycol ether esters such as, for example, the reaction product of the glycol ethers with a polyfunctional organic acid, as well as phenols, cresols, xylene and toluene to which can be added diluents or extenders such as, alkyl benzenes or relatively high boiling point benzine fractions. The solubility of the polyesters in the differing solvents is, of course, largely dependent upon the nature of the starting materials. Although the concentration of the reaction products in the solvent solution can vary within wide limits, it is preferred to use solutions having a solid content of about 10% to about 90% by weight.

The solutions according to this invention may be applied to substrates by processes usual in the lacquer industry such as, for example, spraying, brushing, dipping, and the like. These lacquer solutions according to the invention are particularly suitable as stoving lacquers. The term "stoving lacquers" as used herein is defined as lacquers which cure upon the application of heat usually by being placed in an oven or by passing the substrate containing the coating composition through a heating unit maintained at a desired temperature. The compositions of this invention are heated to a temperature of from about 200° C. to about 360° C. and preferably to a temperature of at least about 230° C. until cured. These coatings exhibit very good mechanical strength, high chemicals and thermal stability and especially good electrical properties. The lacquers and coating compositions of this invention are particularly suitable as wire coverings for use in electrical apparatus which carry high electrical loads, such as generators and motors.

The final phase of the reaction, that is the stoving or heating of the substrate material containing the coating compositions as afore described, can also be effected by adding polyisocyanates which are capable of reacting with both the amino groups and the hydroxyl groups of the polycondensates of this invention. The term "polyisocyanates" as used herein include monomeric and polymeric polyisocyanates, the reaction product of polyisocyanates with compounds containing active hydrogen containing groups in the molecule, and also any substance which will produce polyisocyanates upon being heated to the proper temperature. Any suitable polyisocyanate is applicable to react with the polyesters above described such as, for example, tetramethylene diisocyanate, hexamethylene diisocyanate, thiodipropyl diisocyanate, $\omega,\omega'$ - diisocyanate-dialkyl-benzenes or naphthalenes, cyclohexane diisocyanates, aryl diisocyanates, and polyisocyanates of the alkyl- and aryl- substitution products of benzene and naphthalene, as well as their partial hydrogenation products, 3 - ($\alpha$ - isocyanatoethyl)-phenyl isocyanate, diphenyl ether polyisocyanates and diphenyl-sulfone polyisocyanates. Other specific examples of polyisocyanates which may be used in the reaction of the present invention include such as, for example, decamethylene diisocyanate, butylene-1,3-diisocyanate, butylene-2,3-diisocyanate, cyclohexylene-1,2-diisocyanate, ethylene diisocyanate, m-phenylene diisocyanate, p-phenylene diisocyanate, o-phenylene diisocyanate, 2,4-toluylene diisocyanate, 2,6-toluylene diisocyanate, 3,3'-dimethyl-4,4' - diphenylene diisocyanate, 3,3' - dimethoxy - 4,4'-diphenylene diisocyanate, 3,3' - diphenyl - 4,4'-diphenylene diisocyanate, 4,4'-diphenylene diisocyanate, 3,3'-dichloro-4,4' - diphenylene diisocyanate, 2,4-beta-isocyanato-ethyltoluylene, diphenyl methane triisocyanate, 1,5-naphthalene diisocyanate, 1,4-naphthalene diisocyanate, xylylene diisocyanate, benzene - 1,2,4 - triisocyanate and the like. Also suitable for use as the polyisocyanates in accordance with this invention are the reaction products of any of the above polyisocyanates with compounds containing active hydrogen containing groups in the molecule which are reactive with isocyanate groups for example, alcohols, phenols, amines, hydroxyl polyesters, polyhydric polyalkylene ethers, polyhydric polythioethers, polyacetals, polyesteramides, and the like. The only requirement in this type of reaction being that the polyisocyanate be utilized in excess so that the resulting product has terminal —NCO groups. Suitable for use as the polyisocyanates in the reaction of this invention are the so-called blocked polyisocyanates which are substances which split off polyisocyanates upon being heated to a known temperature. Specific examples of this type of blocked polyisocyanates are the bis-phenyl carbamates of diisocyanates such as, toluylene diisocyanate, p,p'-diphenyl methane diisocyanate, p-phenylene diisocyanate, 1,5-phenylene diisocyanate and the like. Another type of suitable blocked isocyanate in accordance with this invention is the reaction product of 3 mols of a diisocyanate as mentioned above with 1 mol of trimethylol propane and subsequently reacting this product with 3 mols of phenol or cresol.

The quantity of the polyisocyanate added can fluctuate within wide limits. However, it is preferred not to use more polyisocyanate than that which corresponds to a ratio of OH+NH$_2$:NCO of about 1:1. Therefore, it can be seen that the polyisocyanate can be used in an amount just sufficient to react with all of the hydroxyl groups and amino groups present in the reaction product of the 5-amino-benzene-1,3-dicarboxylic acids or the esters thereof and the polyhydroxy compound.

Of course, any suitable pigments, soluble dyestuffs, and flow agents may be added to the reaction products of this invention.

By comparison with corresponding polycondensates which do not contain 5-amino-benzene-1,3-dicarboxylic acids or the lower alkyl esters thereof, the new condensation products of this invention are characterized by a particularly good film forming action and yield firmly adhering hard surface coatings which are insoluble in organic solvents, while the comparison products prepared from dicarboxylic acids such as, for example, adipic, succinic, and the like and even aromatic dicarboxylic acids such as, phthalic, isophthalic, and terephthalic acids and a glycol, without the use of the 5-amino-benzene-1,3-dicarboxylic acid are not capable of forming insoluble films as prepared by the compositions of this invention.

The invention is further illustrated but not limited by the following examples in which parts are given by weight unless otherwise specified.

*Example 1*

While stirring, about 418 parts of the dimethyl ester of 5-amino-benzene-1,3-dicarboxylic acid, about 372 parts of ethylene glycol and about 0.8 part of lead oxide are slowly heated to about 200° C. in a nitrogen atmosphere in proportion to the methanol split off, and left for about 20 hours at this temperature. Vacuum is applied and 150 to about 155 parts of glycol are distilled off. A brittle resin having an hydroxyl content of about 13% and an acid number of about 1.4 remains in the reaction vessel. About 100 grams of the resin consume about 19.0 grams of sodium nitrite. The nitrite test indicates the amount of free amino groups present in the polyester resin. The resin is soluble in any ratio in cresol, mixtures of cresol and xylene as well as in dimethyl formamide. When these solutions are coated onto sheet metal plates and stoved at about 280 to about 300° C., coatings are produced which adhere firmly in a short time, have a very hard surface and are stable with respect to heat and solvents.

*Example 2*

About 209 parts of the dimethyl ester of 5-amino-benzene-1,3-dicarboxylic acid, about 284 parts of ethylene glycol and about 0.2 part of lead oxide are heated for about 20 hours at about 200° C., about 60 parts of methanol being distilled off. About 292 parts of adipic acid are then added and the mixture is then heated at about 200° C. initially under normal conditions and later under vacuum. During the latter period water is split off until an acid number below about 10 is reached. The soft resin remaining in the reaction vessel has an hydroxyl content of about 5.8% and an acid number of about 8.7. Its solutions in acetone, methyl glycol acetate, dimethyl formamide or cresol, after being stoved at about 280° C. on an iron plate, yield elastic films which are no longer soluble in organic solvents such as, methyl glycol acetate.

*Example 3*

Using a stirrer-type vessel, about 332 parts of isophthalic acid are esterified in the usual manner in about 15 hours at about 200° C. with about 248 parts of ethylene glycol and about 0.2 part of lead oxide. After reaching an acid number of about 0.7, the condensate is cooled to about 150° C. and about 209 parts of the dimethyl ester of 5-amino-benzene-1,3-dicarboxylic acid are introduced. Heating at about 200 to about 220° C. is then continued until no more methanol is distilled off. Finally, the trans-esterification is continued for another 2 hours under vacuum at about 220° C. There is left a brittle resin which is completely soluble in methyl glycol acetate, dimethyl formamide and cresol. When applied as a lacquer to supports and after being stoved at temperatures above about 250° C., such solutions quickly produce solvent-resisting films having a high resistance to scratching and a good heat resistance.

*Example 4*

About 104.5 parts of the dimethyl ester of 5-amino-benzene-1,3-dicarboxylic acid, about 254 parts of terephthalic bis-glycol ester and about 0.6 part of lead acetate are initially heated for about 5 hours at about 200° C., and then for about another 6 hours at about 220° C. under a light vacuum. There is left a brittle resin with an hydroxyl content of about 6.5% and an acid number of 2.9. About 100 grams of resin consume about 7.35 grams of sodium nitrite. A 40% solution in equal parts of a cresol-xylene solution is applied to supports, such as sheet iron or copper wire, which are heated for a short time at about 280 to about 350° C. Firmly adhering coatings are formed, which have a high lustre, are highly elastic and have remarkable dielectric properties as well as good resistance to heat.

*Example 5*

About 100 parts of the resinous reaction product according to Example 4 and about 80 parts of a substance which splits off polyisocyanate and obtained by condensing 3 mols of toluylene diisocyanate with 1 mol of trimethyl propane and subsequent reaction with 3 mols of phenol, are dissolved in about 250 parts of cresol. The solution is applied to copper wire and cured at about 250 to about 280° C. A coating is obtained which is resistant to mechanical and chemical influences and which is characterized by good electrical properties and has the capacity of being readily soldered by dipping in molten tin.

*Example 6*

About 84 parts of the dimethyl ester of 5-amino-benzene-1,3-dicarboxylic acid, about 152 parts of terephthalic bis-glycol ester and about 0.48 part of lead acetate are heated for about 7 hours at about 200 to about 215° C. and then after treated for about another 2 hours under vacuum at the same temperature. The resin has good solubility in cresol and in a mixture of equal parts of cresol and xylene. A coating composition is obtained which when applied to metallic supports, provides films having properties similar to the coating obtained according to Example 4.

*Example 7*

About 209 parts of the dimethyl ester of 5-amino-benzene-1,3-dicarboxylic acid and about 762 parts of terephthalic bisglycol ester are heated initially to about 220° C. in the presence of 1 part of lead acetate, until all the methanol has split off (about 12 hours). About 70 parts of glycol are then distilled off at an internal temperature of about 200 to about 210° C. and under a vacuum of about 300 to about 200 mm. The resinous product which has an hydroxyl content of about 5.9% and an acid number of about 1.8 is applied as a thin layer in the form of a 40% solution in equal parts of cresol and xylene, to metallic supports and stoved at about 260° C. to about 300° C. There remains a firm coating which is characterized by good mechanical and chemical resistance.

*Example 8*

About 181 parts of 5-amino-benzene-1,3-dicarboxylic acid, about 332 parts of isophthalic acid and about 284 parts of ethylene glycol are heated to about 200° C. while stirring in a nitrogen atmosphere and left for about 21 hours at this temperature, altogether about 110 cc. of water being distilled off. There remains a transparent resin which is brittle in the cold and which has an hydroxyl content of about 8.2% and an acid number of about 18.7. About 100 grams of the resin consume about 6.2 grams of sodium nitrite. This resin is soluble in any proportion in methyl glycol acetate, dimethyl formamide and cresol. Lacquer coatings produced therefrom are identical in properties with the product described in Example 3.

*Example 9*

About 292 parts of adipic acid and about 416 parts of 2,2-dimethyl-1,3-propanediol are initially heated for several hours at about 200° C. and thereafter treated under vacuum to finish splitting off the water. After distilling off about 71 parts of water, the ester has an acid number of about 3.3.

About 209 parts of the dimethyl ester of 5-amino-benzene-1,3-dicarboxylic acid and about 0.5 part of lead acetate are added to the hot ester, and the heating at about 200° C. is continued until no more methanol is split off, even under vacuum. The resulting polyester resin is completely soluble in all proportions in acetone, acetic ester, methyl gylcol acetate, dimethyl formamide and in cresol.

After solutions thereof have been stoved at temperatures higher than about 250° C., they quickly yield films which are solvent resistant and have good lustre and surface hardness.

*Example 10*

281 parts of the ethyl urethane of 5-amino-benzene-1,3-dicarboxylic acid dimethyl ester (M.P. 167° C.), prepared from the 5-amino-benzene-1,3-dicarboxylic acid dimethyl ester and chloroformic acid ethyl ester, and 381 parts of terephthalic acid-bis-glycol ester and 93 parts of maleic acid-bis-glycol ester are mixed with 0.65 part of lead acetate and with 6.5 parts of a 66% benzine solution of zinc octoate. The mixture is heated to 200° C. Within 9 hours 66 parts of a mixture of 89% methanol and 11% ethanol are distilled off.

After addition of 400 parts of cresol a 62% polyester solution is obtained having a viscosity of 1800 cp./75° C. Further heating for 18 hours of this solution to 200° C. raises the viscosity to 6100 cp./75° C.

When this solution is coated onto sheet metal plates and stoved at about 280° C. coatings are produced which are clear, elastic, and stable with respect to heat and solvents.

The 281 parts of the ethyl urethane of 5-amino-benzene-1,3-dicarboxylic acid dimethyl ester can be replaced by 267 parts of the corresponding methyl urethane (M.P. 243° C.) or by 309 parts of the corresponding n-butyl urethane (M.P. 108° C.). Following the procedure described above, coatings are produced which adhere firmly in a short time and which are stable with respect to heat and solvents.

*Example 11*

119 parts of the 5-amino-benzene-1,3-dicarboxylic acid di-n-propylester (M.P. 118–119° C.), 381 parts of terephthalic-bis-glycol ester and 0.5 part of lead acetate are heated for 10 hours at 220° C. in a nitrogen atmosphere. Heating is then continued for 3 hours under vacuum of 300 mm. 58 parts of n-propanol ($n_D^{20}=1.3845$) distill off. Then, vacuum is increased to 100 mm., at 200 to 210° C., 13.2 parts of glycol ($n_D^{20}=1.4275$) are distilled off.

The resulting polyester resin having an OH content of 5.6% is made into a 50% solution in cresol and xylene (1:1) and coated onto sheet metal plates and stoved at 270 to 280° C. for a short time. A firmly adherent coating is obtained being stable to heat and showing a good elasticity and a high lustre.

Although the invention has been described in considerable detail in the foregoing, in order o properly illustrate the invention, it is to be understood that the purpose of such detail is solely to illustrate the embodiments of the invention and that modifications can be made by those skilled in the art without departing from the spirit and scope of the invention as set forth in the claims.

What is claimed is:

1. A process for the production of coating compositions which comprises condensing a compound having the formula:

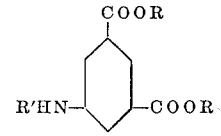

where R is selected from the group consisting of hydrogen and lower alkyl, R' is selected from the group consisting of hydrogen and —COOR", R" is selected from the group consisting of methyl, ethyl and propyl, with an excess of a polyhydric alcohol.

2. A process for the production of coating compositions which comprises condensing a compound having the formula:

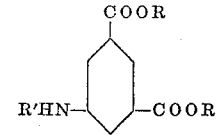

where R is selected from the group consisting of hydrogen and lower alkyl, R' is selected from the group consisting of hydrogen and —COOR", R" is selected from the group consisting of methyl, ethyl and propyl, with a polycarboxylic acid and an excess of a polyhydric alcohol.

3. A process for the production of coating compositions which comprises heating to a temperature of from about 120° C. to about 220° C. a compound having the formula:

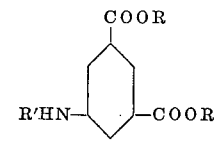

where R is selected from the group consisting of hydrogen and lower alkyl, R' is selected from the group consisting of hydrogen and —COOR", R" is selected from the group consisting of methyl, ethyl and propyl, with an excess of a polyhydric alcohol.

4. A process for the production of coating compositions which comprises condensing a compound having the formula:

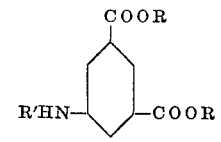

where R is selected from the group consisting of hydrogen and lower alkyl, R' is selected from the group consisting of hydrogen and —COOR", R" is selected from the group consisting of methyl, ethyl and propyl, with an excess of a polyhydric alcohol in a first step and reacting the product of said first step with an organic polyisocyanate in a second step.

5. A process for the production of coating compositions which comprises condensing a compound having the formula:

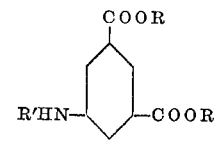

where R is selected from the group consisting of hydrogen and lower alkyl, R' is selected from the group consisting of hydrogen and —COOR", R" is selected from the group consisting of methyl, ethyl and propyl, with a polycarboxylic acid and an excess of a polyhydric alcohol in a first step and reacting the product of said first step with an organic polyisocyanate in a second step.

6. A process for the production of coating compositions which comprises heating to a temperature of from about 120° C. to about 220° C. a compound having the formula:

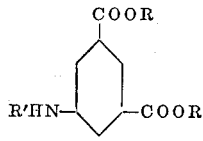

where R is selected from the group consisting of hydrogen and lower alkyl, R' is selected from the group consisting of hydrogen and —COOR", R" is selected from the group consisting of methyl, ethyl and propyl, with an excess of a polyhydric alcohol in a first step and reacting the product of said first step with an organic polyisocyanate in a second step.

7. A process for the production of coating compositions which comprises condensing a compound having the formula:

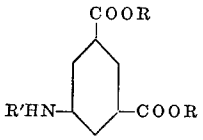

where R is selected from the group consisting of hydrogen and lower alkyl, R' is selected from the group consisting of hydrogen and —COOR", R" is selected from the group consisting of methyl, ethyl and propyl, with an excess of a polyhydric alcohol having from two to four hydroxyl groups.

8. A process for the production of coating compositions which comprises heating to a temperature of from about 120° C. to about 220° C. a compound having the formula:

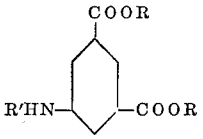

where R is selected from the group consisting of hydrogen and lower alkyl, R' is selected from the group consisting of hydrogen and —COOR", R" is selected from the group consisting of methyl, ethyl and propyl, with an excess of a polyhydric alcohol having from two to four hydroxyl groups.

9. A process for the production of coating compositions which comprises condensing a compound having the formula:

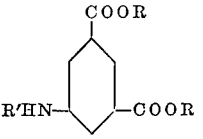

where R is selected from the group consisting of hydrogen and lower alkyl, R' is selected from the group consisting of hydrogen and —COOR", R" is selected from the group consisting of methyl, ethyl and propyl, with an excess of a polyhydric alcohol having from two to four hydroxyl groups in a first step and reacting the product of said first step with an organic polyisocyanate in a second step.

10. A process for the production of coating compositions which comprises heating to a temperature of from about 120° C. to about 220° C. a compound having the formula:

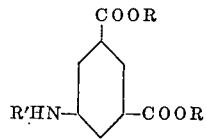

where R is selected from the group consisting of hydrogen and lower alkyl, R' is selected from the group consisting of hydrogen and —COOR", R" is selected from the group consisting of methyl, ethyl and propyl, with an excess of a polyhydric alcohol having from two to four hydroxyl groups in a first step and reacting the product of said first step with an organic polyisocyanate in a second step.

11. A process for the production of coating compositions which comprises mixing and reacting a compound having the formula

where R is selected from the group consisting of hydrogen, and lower alkyl, R' is selected from the group consisting of hydrogen and —COOR", R" is selected from the group consisting of methyl, ethyl and propyl, with an organic dicarboxylic acid to obtain thereby an acid reaction product, and mixing and reacting said acid reaction product with a polyhydric alcohol.

12. A process for the production of a coating composition which comprises mixing and reacting a compound having the formula

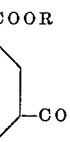

where R is selected from the group consisting of hydrogen and lower alkyl, R' is selected from the group consisting of hydrogen and —COOR", R" is selected from the group consisting of methyl, ethyl and propyl with an organic dicarboxylic acid at a temperature of from about 120° C. to about 220° C., obtaining thereby an acid reaction product, and mixing and reacting said acid reaction product with an excess of a polyhydric alcohol.

13. A process for the production of a coating composition which comprises mixing and reacting a composition having the formula

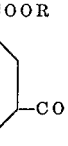

where R is selected from the group consisting of hydrogen and lower alkyl, R' is selected from the group consisting of hydrogen and —COOR", R" is selected from the group consisting of methyl, ethyl and propyl, with an organic dicarboxylic acid, obtaining thereby an acid reaction product, and mixing and reacting said acid reaction product with a polyhydric alcohol to obtain thereby a polyester composition, and reacting said polyester composition with an aromatic polyisocyanate.

14. A coating composition comprising the condensation product of the compound having the formula

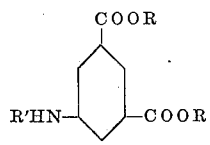

where R is selected from the group consisting of hydrogen and lower alkyl, R' is selected from the group consisting of hydrogen and —COOR", R" is selected from the group consisting of methyl, ethyl and propyl, with an excess of a polyhydric alcohol.

15. A coating composition comprising the reaction product of an organic isocyanate and the condensation product of the compound having the formula

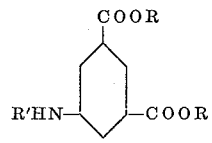

where R is selected from the group consisting of hydrogen and lower alkyl, R' is selected from the group consisting of hydrogen and —COOR", R" is selected from the group consisting of methyl, ethyl and propyl, with an excess of a polyhydric alcohol.

References Cited by the Examiner

UNITED STATES PATENTS

| | | | |
|---|---|---|---|
| 2,282,827 | 5/42 | Rothrock | 260—75 |
| 2,333,639 | 11/43 | Christ et al. | 260—75 |
| 2,343,808 | 3/44 | Schlack | 260—75 |
| 2,563,289 | 8/51 | Steinman | 260—75 |
| 2,621,166 | 12/52 | Schmidt et al. | 260—75 |
| 2,764,565 | 9/56 | Hoppe et al. | 260—75 |
| 2,820,814 | 1/58 | Ginsberg | 260—471 |
| 2,891,929 | 6/59 | Caldwell et al. | 260—75 |

FOREIGN PATENTS 695,164  8/53  Great Britain.

LEON J. BERCOVITZ, *Primary Examiner.*

MILTON STERMAN, NORMAN F. TORCHIN, JOSEPH R. LIBERMAN, *Examiners.*